United States Patent

[11] 3,614,020

[72] Inventor Zoltan L. Herger
Northglenn, Colo.
[21] Appl. No. 32,120
[22] Filed Apr. 27, 1970
[45] Patented Oct. 19, 1971
[73] Assignee Storage Technology Corporation
Boulder, Colo.

[54] TAPE REWIND SPEED CHANGE SYSTEM
4 Claims, 2 Drawing Figs.

[52] U.S. Cl. .......... 242/188, 242/182, 250/219 R
[51] Int. Cl. .......... B65h 59/38, G03b 1/04, G11b 15/06
[50] Field of Search .......... 242/182, 184, 188, 189; 250/219 R, 219 FR

[56] References Cited

UNITED STATES PATENTS 2,952,416 9/1960 Sampson .......... 242/188
3,206,132 9/1965 Libby .......... 242/183
3,497,157 2/1970 Hanes et al. .......... 242/188

*Primary Examiner*—Leonard D. Christian
*Attorney*—Woodcock, Washburn, Kurtz & Mackiewicz ABSTRACT: In a magnetic tape recording and reproducing system a light-reflective marker is positioned at the beginning of each reel of tape. The tape is driven between a file reel and a machine reel, through vacuum columns, and past magnetic heads. A control system includes means for controlling the tape drive in a high-speed rewind and a low-speed rewind. A sensor is positioned at the opening of the vacuum column on the machine reel side of the magnetic heads. This sensor produces an output upon passage of the reflective marker. The output is connected to the control system to switch in from a high-speed rewind to a low-speed rewind upon passage of the marker. In this manner a significant decrease in rewind time is obtained.

PATENTED OCT 19 1971 3,614,020

SHEET 1 OF 2

TAPE REWIND SPEED CHANGE SYSTEM

BACKGROUND OF THE INVENTION

This invention relates to magnetic tape recording and reproducing systems and more particularly to a system in which a tape marker sensor is positioned to switch the tape drive from high-speed rewind to low-speed rewind just before the beginning of the tape enters the vacuum column on the machine reel side of the magnetic heads.

Magnetic tape recording and reproducing units are extensively used with digital data-processing systems. One example of such a magnetic tape unit is the IBM 2420 Model 5 magnetic tape unit described in that company's bulletin File 0 S/360–05 Form A32–0007–1.

In systems of this type the time required to perform any given operation is critical. A saving of even fractions of a second of time is significant. In these machines it is common to rewind the tape at a high speed, for example, 500 inches per minute. When the tape is almost completely rewound, the rewind drive is switched from this high-speed rewind to a low-speed rewind, for example 200 inches per minute. Commonly, means are provided on the machine reel for sensing when the number of loops on the machine reel is reduced to the point at which the tape is almost rewound. Then the machine is switched to low-speed rewind. The last few loops of tape are wound from the machine reel. As the beginning of the tape passes the magnetic heads, a marker on the tape actuates a sensor which stops the rewind drive.

SUMMARY OF THE INVENTION

In accordance with an important aspect of this invention a significant reduction in the rewind time of a magnetic tape unit is obtained by switching the rewind drive from high-speed rewind to low-speed rewind as the beginning of the tape passes the opening of the vacuum column on the machine reel side of the magnetic heads.

Magnetic tapes have a beginning of tape marker (BOT). This marker is sensed at a position close to the magnetic heads to stop the rewind when the marker passes the heads. In accordance with another aspect of this invention, the BOT marker which is already present is additionally used to switch the rewind from high-speed rewind to low-speed rewind.

The advantage of this invention is that it provides high-speed rewind to the full extent of useable tape and therefore the time necessary for rewinding a reel of tape is reduced to the minimum.

The foregoing and other objects, features, and advantages of the invention will be better understood from the following more detailed description.

DESCRIPTION OF A PARTICULAR EMBODIMENT

Figure 1:
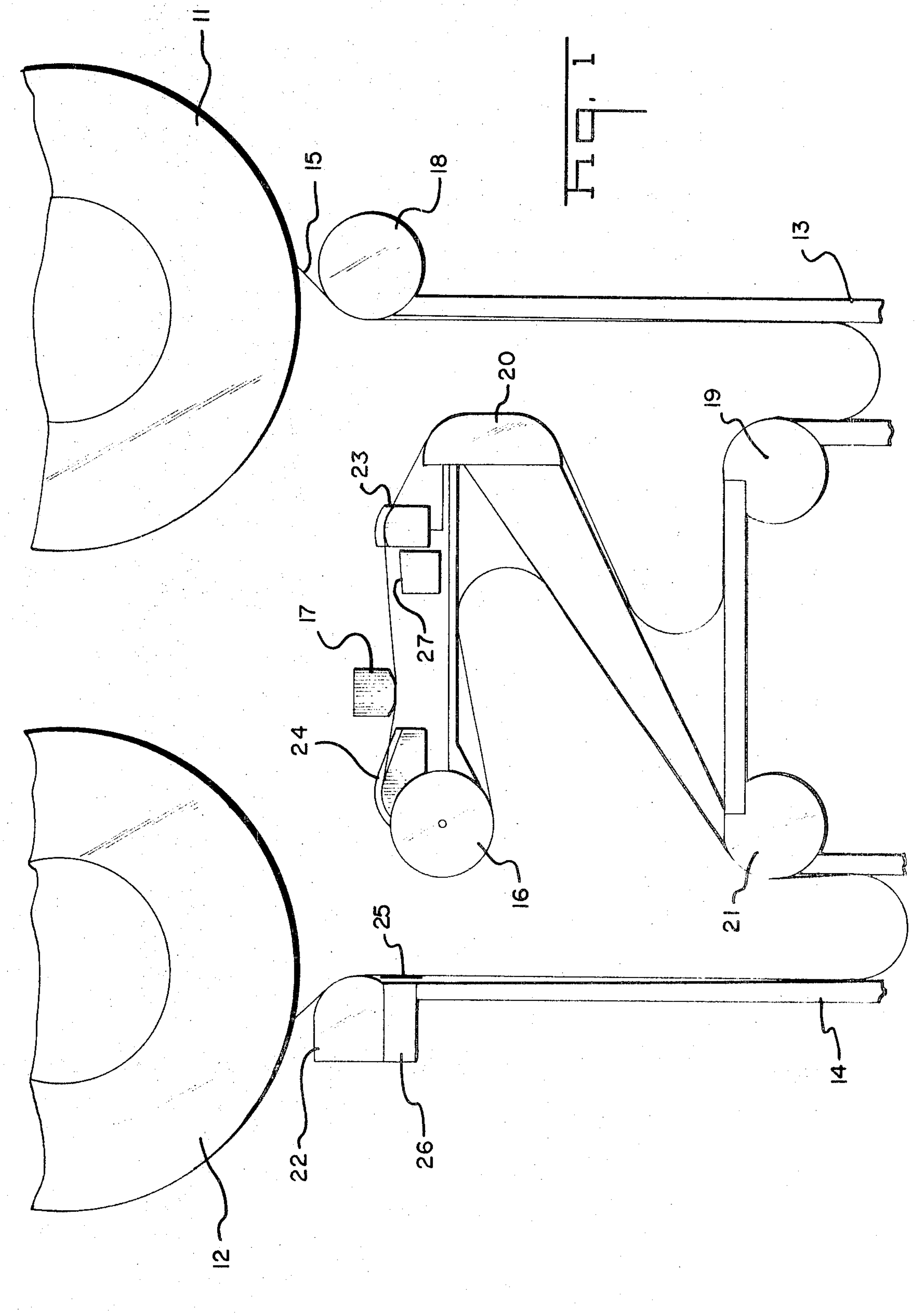
FIG. 1 is a layout of the tape path showing the position of the BOT sensor.

Referring to FIG. 1 there is shown a magnetic tape recording and reproducing system which includes a file reel 11 and a machine reel 12. As is conventional in systems of this type, two vacuum columns 13 and 14 (partially shown) decouple the inertia of the magnetic tape 15 from the single capstan 16 which drives the tape past the magnetic heads. These heads include a read-write head 17 and an erase head not shown. The tape path between the file reel and the machine reel is formed by air bearings 18–22 and by guides 23 and 24.

The magnetic tape includes the light-reflective BOT marker 25 at the beginning of the magnetic tape. In accordance with this invention a sensor 26 is positioned at the opening of the vacuum column 14 which is on the machine reel side of the magnetic heads. Sensor 26 produces an electrical output as the BOT marker 25 passes this point. This electrical output is used to switch the drive mechanism from high-speed rewind to low-speed rewind.

When the BOT marker 25 passes the sensor 27, positioned adjacent the magnetic heads, another electrical output is produced. This is used to stop the rewind drive.

Figure 2:
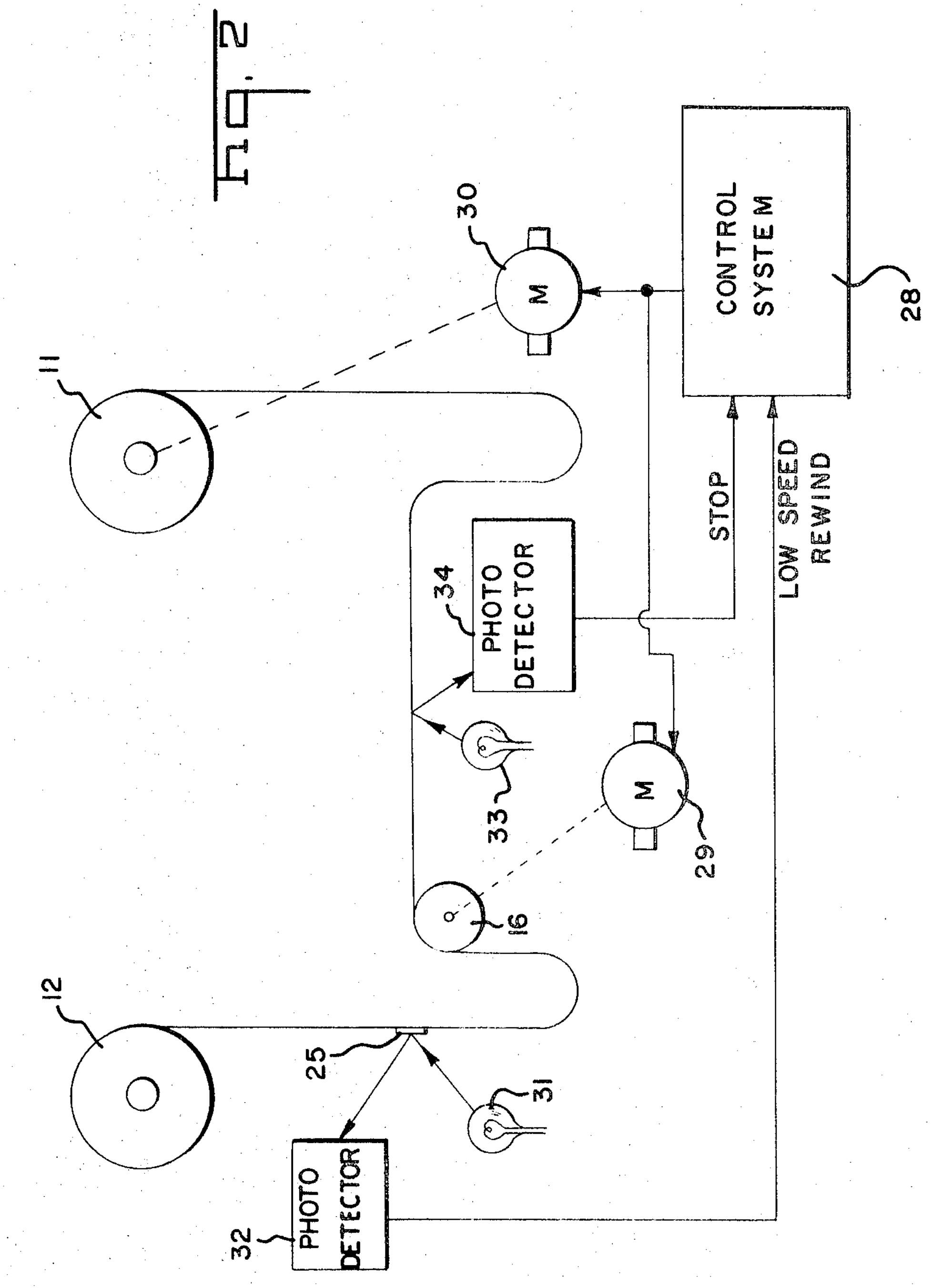
FIG. 2 is a block diagram of the rewind control system.

FIG. 2 shows the control system 28 which controls the speed of the capstan drive motor 29 and the file reel motor 30.

The sensor 26 includes the light source 31 and the photodetector 32. When the light from the source 31 is reflected from the BOT marker 25, the photodetector 32 produces an output which switches control system 28 to low-speed rewind.

The sensor 27 includes the light source 33 and the photodetector 34. When light from the source 33 is reflected from the BOT marker 25, the photodetector 34 produces an output which stops the motor control system 28.

While a particular embodiment of the invention has been shown and described, there are modifications within the true spirit and scope of the invention. The appended claims are intended to cover such modifications.

1. A magnetic tape recording and reproducing system of the type in which a light-reflective marker is positioned at the beginning of each reel of tape comprising:
   - magnetic recording and reproducing heads,
   - two vacuum columns, one on each side of said magnetic heads,
   - a tape drive for driving said tape between a file reel and a machine reel, through said vacuum columns and past said magnetic heads,
   - a control system including means for controlling said tape drive in a high-speed rewind and a low-speed rewind, and
   - a sensor positioned at the opening of the vacuum column on the machine reel side of said magnetic heads, said sensor producing an electrical output which represents the passage of said reflective marker, the output of said sensor being connected to said control system to switch it from a high-speed rewind to a low-speed rewind upon passage of said marker.

2. The system recited in claim 1 wherein said sensor includes a light source and a photodetector positioned so that light from said source is incident upon said tape and is reflected from said marker and detected by said photodetector.

3. The system recited in claim 1 wherein said tape drive includes a file reel motor, a capstan, and a capstan motor and wherein said control system includes means for driving said reel motor and said capstan motor in a high speed and a low-speed rewind.

4. The system recited in claim 1 further comprising:
   - a stop sensor positioned adjacent to said magnetic heads, said sensor being positioned to detect the passage of said marker, said stop sensor being connected to said control system to stop said tape drive upon passage of said marker.